United States Patent Office 2,948,720
Patented Aug. 9, 1960

2,948,720

SULFONIUM COMPOUNDS AND THEIR PREPARATION

Stanley O. Winthrop, Montreal, Quebec, Canada, assignor to American Home Products Corporation, New York, N.Y., a corporation of Delaware No Drawing. Filed May 15, 1959, Ser. No. 813,346

14 Claims. (Cl. 260—243)

This application is a continuation-in-part of my co-pending application, Serial No. 682,644, filed September 9, 1957, now abandoned.

This invention relates to new sulfonium compounds and their preparation.

More particularly, this invention is directed to certain new chemical compounds, the 2'-(10-phenothiazinylcarboxy)ethyl-dialkylsulfonium salts, and to their preparation from readily available starting materials. These new chemical compounds have the formula

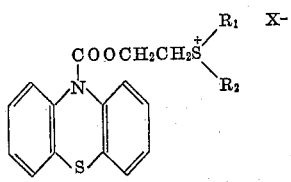

where $R_1$ and $R_2$ represent the same or different lower alkyl groups and X represents bromine or iodine.

Certain of the intermediates prepared in accordance with my novel process for the preparation of these chemical compounds are also new chemical compounds, and my invention includes these novel intermediates as well. These intermediates, the 2'-(10-phenothiazinylcarboxy)-ethyl alkyl sulfides, have the structural formula

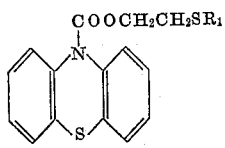

where $R_1$ is lower alkyl.

My new chemical compounds, the 2'-(10-phenothiazinylcarboxy)ethyl-dialkylsulfonium salts, contain the dialkyl sulfonium group

where $R_1$ and $R_2$ have the above-defined significance.

These compounds possess anti-fungal activity and are useful as fungistatic agents. They are also useful as spasmolytics and as anti-cholinergics.

When used as fungistatic agents these compounds may be made up in a cream preparation by incorporation of a small amount of the 2'-(10-phenothiazinylcarboxy)-ethyl-dialkyl sulfonium salt in a base medium, such as a vanishing type cream base, and applied to the skin or other infected area.

Cream preparations wherein the 2'-(10-phenothiazinylcarboxy)ethyl-dialkyl sulfonium salt is incorporated in a greasy or oleaginous base at a concentration of approximately 1 percent of the sulfonium salt have been found especially active as fungistatic agents against such fungi as *Microsporum gypseum* and *Trichophyton granulosum*. While 1 percent of the salt is sufficient to impart effective anti-fungal activity to the cream preparation, the chemical compound may, of course, be present in other proportions, and it is especially satisfactory as an anti-fungal agent when incorporated in amounts ranging from 0.5 to 5 percent in a vanishing cream-type base.

When substantially 1 percent of one of these 2'-phenothiaizinylcarboxy)ethyl-dialkyl sulfonium salts, such as 2'-phenthiazinylcarboxy)ethyl dimethyl sulfonium bromide or 2'-(10-phenothiazinylcarboxy)ethyl diethyl sulfonium iodide, is incorporated in a commercially available vanishing cream, the ability of the compound to inhibit the growth of fungi is readily shown by the following test data.

A sample of 1 gram of each of two creams, each cream containing, respectively, 1 percent of 2'-(10-phenothiazinylcarboxy)ethyl dimethyl sulfonium bromide, and 1 percent of 2'-(10-phenothiazinylcarboxy)-ethyl diethyl sulfonium iodide, was streaked across one diameter of Petri dishes containing Sabouraud's agar. A loopful of each of the fungus test organisms selected, in this case, *Trichophyton granulosum* and *Microsporum gypseum*, was streaked across another diameter of the particular Petri dishes containing each of the test compounds, at right angles to the diameter across which the particular test organism undergoing test, in each case, was streaked. The Petri dishes were then incubated at 28° C. for 8 days and then examined to determine inhibition of growth of the microorganism. The extent of inhibition of growth may be measured by the distance, in millimeters, from the test substance to the commencement of growth of the fungus test organism, in each case.

Tested in this way the compound 2'-(10-phenothiazinylcarboxy)ethyl dimethyl sulfonium bromide, typical of my new sulfonium salts, showed growth inhibition equal to 8 to 10 millimeters against *Trichophyton granulosum*, and growth inhibition equal to 6 to 8 millimeters when tested against *Microsporum gypseum*.

When tested under identical conditions, using Petri dishes of the type described, another of my new chemical compounds, 2'-(10-phenothiazinylcarboxy)ethyl diethyl sulfonum iodide, gives a growth inhibition of approximately 8 millimeters when tested against *Trichophyton granulosum* and a growth inhibition of 12 to 15 millimeters when tested against *Microsporum gypseum*.

As contrasted with these values showing anti-fungal properties which are typical of my new sulfonium compounds, a typical compound of Cusic Patent No. 2,650,-919, but containing nitrogen in place of the sulfur, such as β-diethylaminoethyl phenothiazine-10-carboxylate methobromide, shows no anti-fungal activity whatever when tested, in the same manner, against these typical fungus test organisms, i.e. *Trichophyton granulosum* and *Microsporum gypseum*.

In preparing the new chemical compounds, it is preferred to start with a phenothiazine-10-carboxylic acid halide, preferably phenothiazine-10-carboxylic acid chloride. This is reacted with a β-hydroxyethyl lower alkyl sulfide to form a 2'-(10-phenothiazinylcarboxy)ethyl lower alkyl sulfide. As previously stated, these intermediate chemical compounds are also new compounds, and constitute part of my invention. The 2'-(10-phenothiazinylcarboxy)ethyl lower alkyl sulfide is then reacted with a lower alkyl bromide or lower alkyl iodide to form the desired new, pharmacologically active, sulfonium salts.

The process of preparing the desired compounds may be represented as follows:

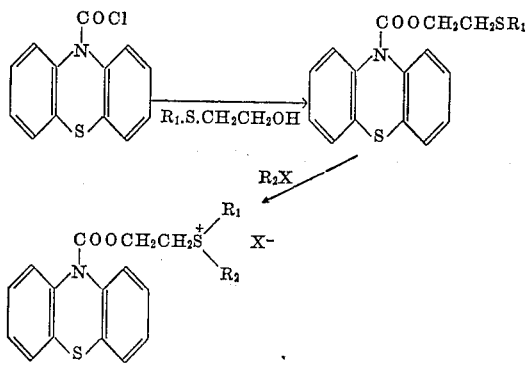

$R_1$ and $R_2$ each represent lower alkyl and X is bromine or iodine.

The β-hydroxyethyl lower alkyl sulfide and phenothiazine-10-carboxylic acid chloride are brought together, preferably at an elevated temperature, and in substantially equimolar amounts, either in an inert solvent in the presence of a suitable condensing agent such as a tertiary amine (for example pyridine), or in a tertiary amine alone, as, for example in pyridine alone. In the latter case the tertiary amine acts both as solvent and condensing agent. When the reaction is reasonably complete at this elevated temperature, usually within several hours, the novel intermediate, the 2′-(10-phenothiazinylcarboxy)ethyl lower alkyl sulfide, is recovered. The latter is then reacted with a lower alkyl bromide or lower alkyl iodide to form the desired therapeutically-active sulfonium salt. This is readily accomplished by bringing the reactants together in substantially equimolar proportions and allowing the mixture to stand in the dark for an extended period until the reaction has proceeded and the novel product may be recovered from the reaction mixture.

Ether and alcohol are suitable diluents in which the 2-(10-phenothiazinylcarboxy)ethyl lower alkyl sulfide and lower alkyl halide may be brought into contact with each other, but when nitromethane is used as solvent-diluent the reaction is more rapid and a better yield of the desired sulfonium salt is secured.

EXAMPLE 1

*β-Hydroxyethyl methyl sulfide*

This compound was prepared in accordance with the synthesis described in Organic Syntheses Coll., vol. II, page 396.

87 grams (1.08 mole) of ethylenechlorohydrin and 54 grams (1.15 mole) of methylmercaptan were brought into contact with each other in 500 milliliters of ethanol containing 54 grams (1.0 mole) of sodium methoxide. This resulted in approximately 43 grams of β-hydroxyethyl methyl sulfide boiling at 163–166° C.

EXAMPLE 2

*β-Hydroxyethyl ethyl sulfide*

This compound was prepared in accordance with the same procedure described for the preparation of β-hydroxyethyl methyl sulfide, i.e. by following the procedure given in Organic Syntheses Coll., vol. II, page 396.

87 grams (1.08 mole) of ethylenechlorohydrin, 72 grams (1.15 mole) of ethylmercaptan and 54 grams (1.0 mole) of sodium methoxide were reacted in 500 milliliters of ethanol. The yield was 48 grams of β-hydroxyethyl ethyl sulfide, boiling at 181° C.

EXAMPLE 3

*2′-(10-phenothiazinylcarboxy)ethyl methyl sulfide*

20.8 grams (0.08 mole) of phenothiazine-10-carboxylic acid chloride, 7.4 grams (0.08 mole) of β-hydroxyethyl methyl sulfide and 6.4 grams (0.08 mole) of pyridine were dissolved in 200 milliliters of benzene and the mixture refluxed for 6 hours. The reaction mixture was then allowed to cool, washed with water and dried over sodium sulfate.

The benzene was removed by distillation under reduced pressure, leaving a heavy oily residue. This residue was taken up in ether and insoluble material present therein was discarded. The solution was then evaporated at a pressure less than atmospheric and the oily residue resulting triturated with a little methanol. This yielded 13 grams of solid product whose melting point was 94–98° C. After three recrystallizations from hexane solution the solid product melted at 108–109° C. This crystalline material, 2′-(10-phenothiazinylcarboxy)ethyl methyl sulfide, was subjected to analysis which confirmed the empiric formula $C_{16}H_{15}NS_2O_2$.

Calculated: C, 60.50; H, 4.76; N, 4.42; S, 20.22. Found: C, 60.60; H, 4.90; N, 4.44, 4.40; S, 20.00, 19.73.

EXAMPLE 4

*2′-(10-phenothiazinylcarboxy)ethyl ethyl sulfide*

78.6 grams (0.3 mole) of phenothiazine-10-carboxylic acid chloride and 31.8 grams (0.3 mole) of β-hydroxyethyl ethyl sulfide were dissolved in 120 milliliters of pyridine and the mixture heated to 80° C. The temperature was held at about 80° C. by the use of a cooling bath until the exothermic reaction had subsided, this requiring approximately 1½ hours.

The reaction mixture was then heated to 95° C. for one hour and poured into a mixture of ice and water. The product solidified and was filtered off. This resulting crude solid was dissolved in ether and ether-insoluble material removed therefrom and discarded. The ether solution was then washed with water, dried over sodium sulfate and evaporated down, leaving an oily residue which crystallized from hexane solution to yield 58 grams of product melting at 79–82° C. An additional recrystallization from ethanol solution resulted in raising the melting point of the product to 82–83° C. This crystalline material was 2′-(10-phenothiazinylcarboxy)ethyl ethyl sulfide. Analysis confirmed the empiric formula $C_{17}H_{17}NS_2O_2$.

Calculated: C, 61.65; H, 5.17; N, 4.23; S, 19.35. Found: C, 61.39; H, 5.15; N, 4.31, 4.21; S, 19.41.

EXAMPLE 5

*2′-(10-phenothiazinylcarboxy)ethyl dimethyl sulfonium bromide*

5 grams 2′-(10-phenothiazinylcarboxy)ethyl methylsulfide was dissolved in 50 milliliters of nitromethane and approximately 20 milliliters of a 25 percent methanolic methyl bromide solution added. The reaction mixture was allowed to stand in the dark at room temperature for 2 weeks.

Ether was then added, and 4 grams of a sulfonium salt, melting at 146–147° C. (dec.), was filtered off. This product, which was 2′-(10-phenothiazinylcarboxy)ethyl dimethyl-sulfonium bromide, was purified by dissolving it in methanol, followed by precipitation with ether. There was thus secured 2.8 grams of the sulfonium salt melting at 146–148° C. (dec.). Analysis confirmed the empiric formula $C_{17}H_{18}NS_2O_2Br$.

Calculated: N, 3.41; S, 15.55; Br, 19.45. Found: N, 3.23, 3.13; S, 15.96, 15.31; Br, 19.75, 19.79.

EXAMPLE 6

*2′-(10-phenothiazinylcarboxy)ethyl dimethyl sulfonium iodide*

3.0 grams (0.0095 mole) 2′-(10-phenothiazinylcarboxy)ethyl methyl sulfide was dissolved in 10 milliliters of methyl iodide and the mixture allowed to stand in the dark for four days at room temperature. Ether was then added and 3.7 grams of a sulfonium salt melting at 126–

127° C. was filtered off. Two recrystallizations from methanol-ether mixture raised the melting point to 138–139° C. The product, 2'-(10-phenothiazinylcarboxy)-ethyl dimethylsulfonium iodide, analyzed correctly for the empiric formula $C_{17}H_{18}NS_2O_2I$.

Calculated: N, 3.05; S, 13.93; I, 27.62. Found: N, 3.39, 3.26; S, 13.58, 13.67; I, 27.89, 27.57.

EXAMPLE 7

*2'-(10-phenothiazinylcarboxy)ethyl diethyl sulfonium iodide*

In preparing this compound it was found that by using nitromethane as a solvent the reaction could be speeded up and a purer product secured.

5 grams of 2'-(10-phenothiazinylcarboxy)ethyl ethylsulfide was dissolved in 25 milliliters of nitromethane containing 10 milliliters of ethyliodide. The reaction mixture was allowed to stand in the dark at room temperature for one week. Ether was then added and 1.9 grams of a sulfonium salt melting at 120–121° C. was filtered off. The substantially pure product was 2'-(10-phenothiazinylcarboxy)ethyl diethylsulfonium iodide. Analysis confirmed the empiric formula $C_{19}H_{22}NS_2O_2I$.

Calculated: N, 2.87; S, 13.15. Found: N, 2.78, 2.71; S, 13.24.

EXAMPLE 8

*2'-(10-phenothiazinylcarboxy)ethyl ethyl methylsulfonium iodide*

6.62 grams (0.02 mole) of 2'-(10-phenothiazinylcarboxy)ethyl ethylsulfide was dissolved in 10 milliliters of methyliodide and allowed to stand in the dark at room temperature for 4 days. On addition of ether the product precipitated as a thick oil. After several triturations with ether, the oil crystallized from a mixture of methanol-ether to yield 1.0 gram of a solid product, melting at 116–117° C. This was 2'-(10-phenothiazinylcarboxy)-ethyl ethyl methylsulfonium iodide. Analysis confirmed the empiric formula $C_{18}H_{20}NS_2O_2I$.

Calculated: S, 13.53; I, 26.80. Found: S, 13.11, 13.80; I, 27.20, 26.57.

EXAMPLE 9

*2'-(10-phenothiazinylcarboxy)ethyl isopropyl ethylsulfonium iodide*

5 grams 2'-(10-phenothiazinylcarboxy)ethyl ethylsulfide was dissolved in 25 milliliters of nitromethane containing 10 milliliters of isopropyliodide. The reaction mixture was allowed to stand in the dark at room temperature for four weeks. Ether was then added and a small amount of sulfonium salt melting at 130–131° C. was filtered off. The substantially pure product was 2'-(10-phenothiazinylcarboxy)ethyl isopropylethyl sulfonium iodide. Analysis confirmed the empiric formula $C_{20}H_{24}NS_2O_2I$.

I claim:

1. A compound of the formula

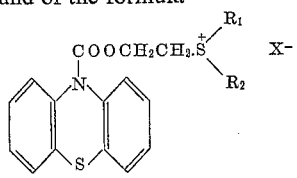

where $R_1$ and $R_2$ each represent lower alkyl and X represents a halogen selected from the group which consists of bromine and iodine.

2. A compound of the formula

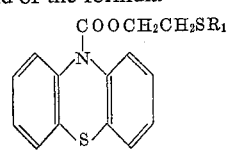

where $R_1$ represents lower alkyl.

3. 2'-(10-phenothiazinylcarboxy)ethyl dimethylsulfonium bromide.

4. 2'-(10-phenothiazinylcarboxy)ethyl dimethylsulfonium iodide.

5. 2'-(10-phenothiazinylcarboxy)ethyl diethylsulfonium iodide.

6. 2'-(10-phenothiazinylcarboxy)ethyl isopropyl ethylsulfonium iodide.

7. 2'-(10-phenothiazinylcarboxy)ethyl ethyl-methylsulfonium iodide.

8. 2'-(10-phenothiazinylcarboxy)ethyl methyl sulfide.

9. 2'-(10-phenothiazinylcarboxy)ethyl ethyl sulfide.

10. The process of preparing a compound of the formula

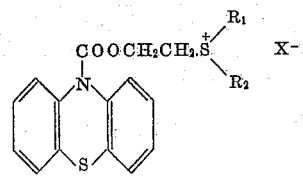

wherein $R_1$ and $R_2$ each represent lower alkyl and X represents a halogen selected from the group which consists of bromine and iodine, which comprises bringing together, in substantially equimolar proportions, at a temperature above room temperature, and in the presence of a tertiary amine condensing agent, phenothiazine-10-carboxylic acid chloride and a β-hydroxy-ethylalkyl sulfide of the formula $R_1SCH_2CH_2OH$ to form a compound of the formula

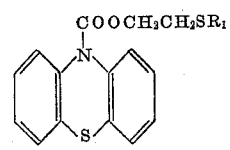

$R_1$ in each instance representing lower alkyl, and then bringing said product into contact, in substantially equimolar proportions, with a lower alkyl halide having the formula $R_2X$ where $R_2$ represents lower alkyl and X represents a halogen selected from the group which consists of bromine and iodine.

11. The process of preparing a compound of the formula

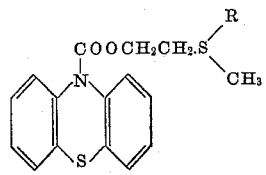

wherein R represents lower alkyl and X represents a halogen selected from the group which consists of bromine and iodine which comprises bringing together, in substantially equimolar proportions, at a temperature above room temperature, and in the presence of a tertiary amine condensing agent, phenothiazine-10-carboxylic acid chloride and β-hydroxyethyl methyl sulfide, thus forming a compound of the formula

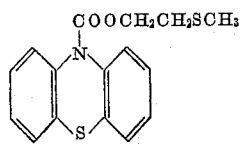

and then bringing said product into contact, in substantially equimolar proportions, with a lower alkyl halide selected from the group which consists of lower alkyl bromides and lower alkyl iodides.

12. The process of preparing a compound of the formula

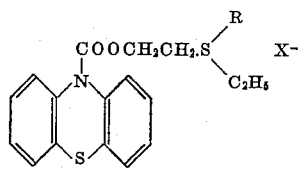

wherein R represents lower alkyl and X represents a halogen selected from the group which consists of bromine and iodine which comprises bringing together, in substantially equimolar proportions, at a temperature above room temperature, and in the presence of a tertiary amine condensing agent, phenothiazine-10-carboxylic acid chloride and β-hydroxyethyl ethyl sulfide, thus forming a compound of the formula

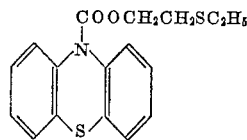

and bringing said product into contact, in substantially equimolar proportions, with a lower alkyl halide selected from the group which consists of lower alkyl bromides and lower alkyl iodides.

13. The process of preparing a compound of the formula

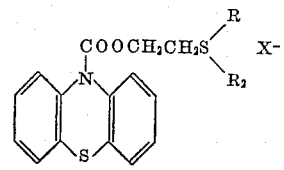

wherein $R_1$ and $R_2$ each represent lower alkyl and X represents a halogen selected from the group which consists of bromine and iodine, which comprises bringing a compound of the formula

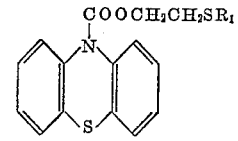

wherein $R_1$ has the above defined significance into contact, in substantially equimolar proportions with a lower alkyl halide selected from the group which consists of lower alkyl bromides and lower alkyl iodides, said reactants being allowed to stand in contact with each other in a diluent.

14. The process defined in claim 13 wherein said reactants are brought together and allowed to remain in contact in the presence of nitromethane.

No references cited.

UNITED STATES PATENT OFFICE
Certificate of Correction

Patent No. 2,948,720                                  August 9, 1960

Stanley O. Winthrop

It is hereby certified that error appears in the printed specification of the above numbered patent requiring correction and that the said Letters Patent should read as corrected below.

Column 2, lines 11 and 12, for "2'-phenothiaizinylcarboxy)ethyl-" read — 2'-(10-phenothiazinylcarboxy)ethyl- —; lines 13 and 14, for "2'-phenthiazinylcarboxy)ethyl" read —2'-(10-phenothiazinylcarboxy)ethyl—; column 6, lines 48 to 54, claim 11, the formula should appear as shown below instead of as in the patent:

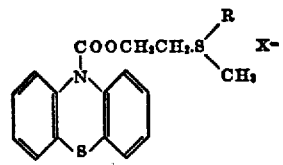

column 8, line 3, claim 13, for the top "R" at the right hand side of the first formula read —$R_1$—.

Signed and sealed this 11th day of April 1961.

[SEAL]

Attest:
ERNEST W. SWIDER,
*Attesting Officer.*

ARTHUR W. CROCKER,
*Acting Commissioner of Patents.*